(12) United States Patent
Hawranek et al.

(10) Patent No.: US 11,716,389 B1
(45) Date of Patent: Aug. 1, 2023

(54) VISUALIZATION OF WIRELESS SIGNAL PROPAGATION IN A NETWORKED LIGHTING CONTROL SYSTEM

(71) Applicant: Silvair Sp. z o.o., Cracow (PL)

(72) Inventors: Piotr Hawranek, Bibice (PL); Marek Niedbach, Cracow (PL); Pawel Smietanka, Cracow (PL); Szymon Slupik, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 0 days.

(21) Appl. No.: 17/954,520

(22) Filed: Sep. 28, 2022

(51) Int. Cl.
*H04L 67/125* (2022.01)
*G16Y 10/35* (2020.01)
*G16Y 20/20* (2020.01)
*G16Y 40/20* (2020.01)

(52) U.S. Cl.
CPC ............ *H04L 67/125* (2013.01); *G16Y 10/35* (2020.01); *G16Y 20/20* (2020.01); *G16Y 40/20* (2020.01)

(58) Field of Classification Search
None
See application file for complete search history.

(56) References Cited

U.S. PATENT DOCUMENTS

| 2014/0049164 A1* | 2/2014 | McGuire | H05B 45/20 315/307 |
| 2017/0241200 A1* | 8/2017 | Feldstein | E06B 9/68 |
| 2019/0273659 A1* | 9/2019 | Slupik | H04L 41/12 |

* cited by examiner

*Primary Examiner* — Kevin T Bates
*Assistant Examiner* — Emad Siddiqi
(74) *Attorney, Agent, or Firm* — McGeary Cukor, LLC; Kenneth Ottesen; Jason Paul DeMont

(57) ABSTRACT

A networked lighting control system having the capability to identify problems within its own wireless network. The system includes a plurality of luminaire nodes. Each luminaire receives, via a wireless mesh network, a series of messages containing an output control indication. The indication represents a "delta" value, which the luminaire uses, for each received message, to generate a control signal to increase the light output of its lamp by a known amount. The luminaire transmits a series of messages containing the output control indication, wherein each transmitted message corresponds to each message that had been received by the luminaire. After a series of such "delta" messages have been originated and broadcast over the mesh network, the luminaires that failed to receive some of the messages will appear dimmer than the luminaires that received all, or more of, the messages, providing a visualization of signal propagation problems.

20 Claims, 11 Drawing Sheets

800

US 11,716,389 B1

VISUALIZATION OF WIRELESS SIGNAL PROPAGATION IN A NETWORKED LIGHTING CONTROL SYSTEM

FIELD OF THE INVENTION

The present invention relates to building automation and control in general, and, more particularly, to a wireless networked lighting control system having the capability to identify problems within its own network.

BACKGROUND OF THE INVENTION

"Commercial building automation," or "commercial automation," refers to the use of computer and information technology to control commercial building systems, such as lighting, HVAC ("heating, ventilation, and air conditioning"), audio-visual, smoke detection, security, and shading, among other systems. Using specialized hardware and control logic, building devices can monitor their environment and can be controlled automatically. Although commercial automation has been available at some level of sophistication for some time, it steadily becomes more practical, from both a technological and cost perspective.

A sophisticated commercial automation and control system might include sensors (e.g., of temperature, of light, of motion or occupancy, etc.), controllers (e.g., a general-purpose personal computer, a dedicated automation controller, etc.), and actuators or actors (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Lighting automation and control systems now exist in which luminaires that comprise sensors, lamps, and control logic are networked together as "smart nodes," in what is sometimes referred to as a "connected lighting system" or a "networked lighting control system." in such a network, sensors which can be standalone and/or integrated into the luminaire nodes collect data about the local environment, such as data related to occupancy in the vicinity of the luminaires. The networked luminaires communicate with one another, in some cases sharing the sensor data, and adjust the light output of the lamps via the control logic, with some level of coordination across the networked luminaires.

FIG. 1 depicts connected lighting network 100 in the prior art. Network 100 is an example of a wireless networked lighting control system and comprises smart nodes 101-1 through 101-M, wherein M is a positive integer (e.g., M being equal to 5 as depicted, etc.). As depicted in FIG. 1, the nodes are luminaires (denoted by "L"). Additionally, each of the luminaires comprises an occupancy sensor unit. The networked nodes communicate wirelessly with one another via transmitted signals 102-1, 102-2, 102-3, 102-4, and 102-5. The group of nodes can be situated within a building or other structure.

Network 100 is a mesh data network that enables communication among smart nodes 101-1 through 101-M. To this end, the nodes within network 100 distribute data (e.g., the packet-based messages, etc.) in accordance with Bluetooth mesh networking. A "mesh network" is a network topology in which each node relays data for the network. The nodes that are involved cooperate in the distribution of data in the network.

Being a mesh network, network 100 is an example of a distributed control system. Distributed control systems have some advantages over centralized control systems, including in some cases the elimination of a single point of failure and the reduction of processor load. Furthermore, technologies such as Bluetooth mesh networking can enable a single, published message to be processed by more than one network node; for example, each sensor data message can be acted upon by more than one node.

A networked lighting control system implemented using the aforementioned mesh network has a fair amount of robustness. There are situations, however, in which the constituent luminaires have problems communicating reliably with other luminaires within the mesh network. For example, imperfections in radio frequency (RF) propagation alone can be responsible for a variety of reliability issues, Such issues are linked, for example, to signal attenuation between a transmitter and receiver, to interference from a source of RF emissions in the radio frequency band that is in use, or to the operating characteristics of a transmitter and receiver being out of alignment ("out of tune") with respect to each other. Moreover, it is often difficult to identify those luminaires that have problems communicating reliably.

What is needed is a networked lighting control system that also can be used to identify problems within its own wireless network, without some of the disadvantages in the prior art.

SUMMARY OF THE INVENTION

The present invention enables a networked lighting control system to identify problems within its own wireless network, and without at least some of the disadvantages in the prior art. The networked lighting control system of an illustrative embodiment of the present invention disclosed herein includes a plurality of luminaire nodes in a wireless mesh network. As part of a test, each luminaire is configured to receive, via the wireless mesh network, a series of messages containing an output control indication. The output control indication represents a "delta" or change value, which a first luminaire uses, for each received message, to generate an output control signal to change the light output of its lamp by a known amount. Illustratively, the output control signal increases incrementally the lamp's light output by a known percentage (e.g., three percent, etc.). The first luminaire is further configured to transmit, via the wireless mesh network, a series of messages containing the output control indication, wherein each transmitted message corresponds to each message that had been received by the first luminaire—and for which an output control signal had been generated to control the luminaire's lamp.

Similarly, a second luminaire, as well as one or more other luminaires in the mesh network, is configured to receive at least some of the messages transmitted by the first luminaire and to generate, for each received message, an output control signal to increase the light output of its lamp. The luminaires are each further configured to transmit, via the wireless mesh network, a series of messages containing the output control indication, the series of messages corresponding to whatever messages had been received.

The significance of the message handling described above is that after a series of such "delta" messages have been originated by the first luminaire and broadcast over the mesh network by one or more other luminaires, the luminaires that failed to receive some of the messages will appear dimmer than the luminaires that received all of messages or, at least, received more of the messages. Conversely, the luminaires that received all, or more, of the messages will appear brighter than the luminaires that received fewer of the messages.

Advantageously, the variations of lighting across the luminaires enable a person to visualize the wireless signal propagation throughout the networked lighting control system and to apply corrective actions. Such a visualization is particularly important considering that troubleshooting costs can increase exponentially as the number of luminaire nodes in a networked lighting system increases, sometimes numbering in the hundreds of nodes or more, and where labor costs are significant. The corrective actions might include changing or fixing a receiving antenna location, reconfiguring one or more message transmission parameters or relaying parameters in the underlying mesh network, and so forth.

In some embodiments, a testing device, such as a tablet computer, is configured to transmit one or more messages containing a first network address. The first luminaire node, in the plurality of luminaire nodes described above, is configured to receive the message(s) containing the first network address and to generate, based on the first network address matching an address stored at the first luminaire node, one or more output control signals to increase the light output of the first luminaire's lamp as described above and to forward the messages to the other luminaires. Later, the testing device, or a different device, can query one or more of the luminaires to retrieve the light output values in effect and display or present the light output values, either graphically or numerically, or both, thereby providing additional assistance to the person troubleshooting the networked lighting control system.

An illustrative first system that includes a plurality of data-networking nodes in a wireless mesh network, the system comprising: a testing device configured to transmit at least one message containing a first network address; a first luminaire in the plurality of data-networking nodes, the first luminaire comprising: (a) a first receiver configured to receive the at least one message containing the first network address, (b) a first controller configured to generate, based on the first network address matching a network address stored at the first luminaire, a first series of output control signals to change incrementally light output in accordance with an output control indication, (c) a first lamp configured to provide light based on the first series of output control signals, and (d) a first transmitter configured to transmit, via the wireless mesh network, a second series of messages containing the output control indication, wherein the second series of messages corresponds to generating the first series of output control signals; and a second luminaire in the plurality of data-networking nodes, the second luminaire comprising: (a) a second receiver configured to receive at least some of the messages in the second series of messages, (b) a second controller configured to generate, for each received message in the second series of messages, a second output control signal to change incrementally light output in accordance with the output control indication in the received message in the second series of messages, (c) a second lamp configured to provide light based on the second output control signal, and (d) a second transmitter configured to transmit, via the wireless mesh network and for each received message in the second series of messages, a message that contains the output control indication, resulting in a third series of messages being transmitted that correspond to the received messages in the second series of messages.

An illustrative second system that includes a plurality of data-networking nodes in a wireless mesh network, the system comprising: a testing device configured to transmit at least one message containing a first network address; a first luminaire in the plurality of data-networking nodes, the first luminaire comprising: (a) a first receiver configured to receive the at least one message containing the first network address, (b) a first controller configured to generate, based on the first network address matching the network address of the first luminaire, a first series of output control signals to increase incrementally light output in accordance with an output control indication, (c) a first lamp configured to provide light based on the first series of output control signals, and (d) a first transmitter configured to transmit, via the wireless mesh network, a second series of messages containing the output control indication, wherein the second series of messages corresponds to generating the first series of output control signals; and a second luminaire in the plurality of data-networking nodes, the second luminaire comprising: (a) a second receiver configured to receive at least some of the messages in the second series of messages, (b) a second controller configured to generate, for each received message in the second series of messages, a second output control signal to increase incrementally light output in accordance with the output control indication in the received message in the second series of messages, and (c) a second lamp configured to provide light based on the second output control signal.

An illustrative third system that includes a plurality of data-networking nodes in a wireless mesh network, the system comprising: a testing device configured to (a) receive a light output level from at least one luminaire in the plurality of data-networking nodes and (b) transmit at least one message containing a first network address, wherein the first network address is based on the light output level received; a first luminaire in the plurality of data-networking nodes, the first luminaire comprising: (a) a first receiver configured to receive the at least one message containing the first network address, (b) a first controller configured to generate, based on the first network address matching the network address of the first luminaire, a first series of output control signals to increase incrementally light output in accordance with an output control indication, (c) a first lamp configured to provide light based on the first series of output control signals, and (d) a first transmitter configured to transmit, via the wireless mesh network, a second series of messages containing the output control indication, wherein the second series of messages corresponds to generating the first series of output control signals; and a second luminaire in the plurality of data-networking nodes, the second luminaire comprising: (a) a second receiver configured to receive at least some of the messages in the second series of messages, (b) a second controller configured to generate, for each received message in the second series of messages, a second output control signal to increase incrementally light output in accordance with the output control indication in the received message in the second series of messages, and (c) a second lamp configured to provide light based on the second output control signal.

DETAILED DESCRIPTION

Figure 1:
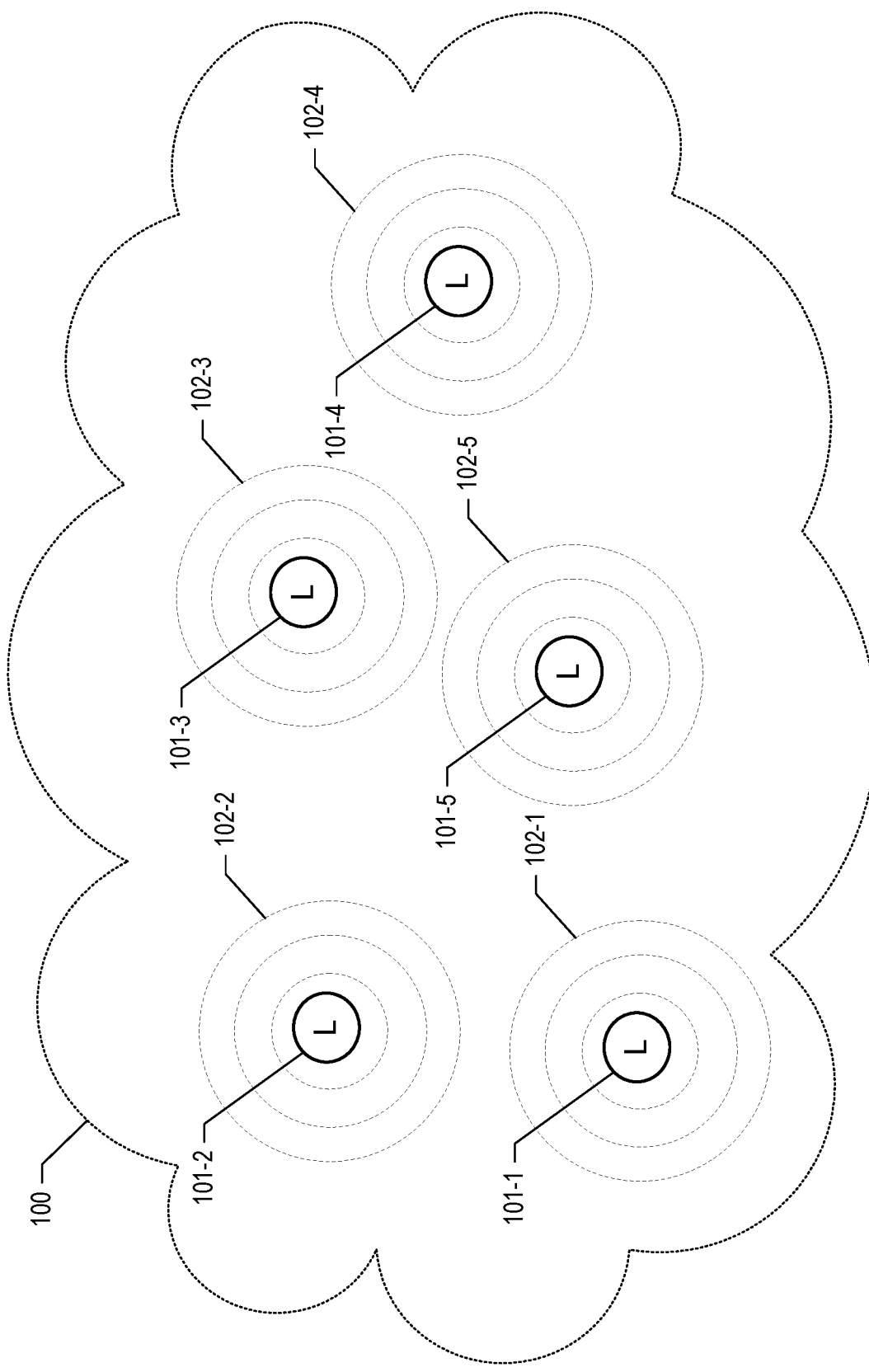
FIG. 1 depicts connected lighting network 100 in the prior art.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp. A luminaire having a network address and operating within a network is a "luminaire node."

Network address—For the purposes of this specification, the term "network address," or "computer network address" or "address," is defined as a numerical label assigned to each device (e.g., luminaire node, etc.) participating in a computer network. For example, an Internet Protocol address (IP address) is a numerical label assigned to each device participating in a computer network that uses the Internet Protocol for communication.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are known in the art are depicted in block diagram form in the accompanying figures in order to keep salient aspects of the present invention from being unnecessarily obscured.

Figure 2:
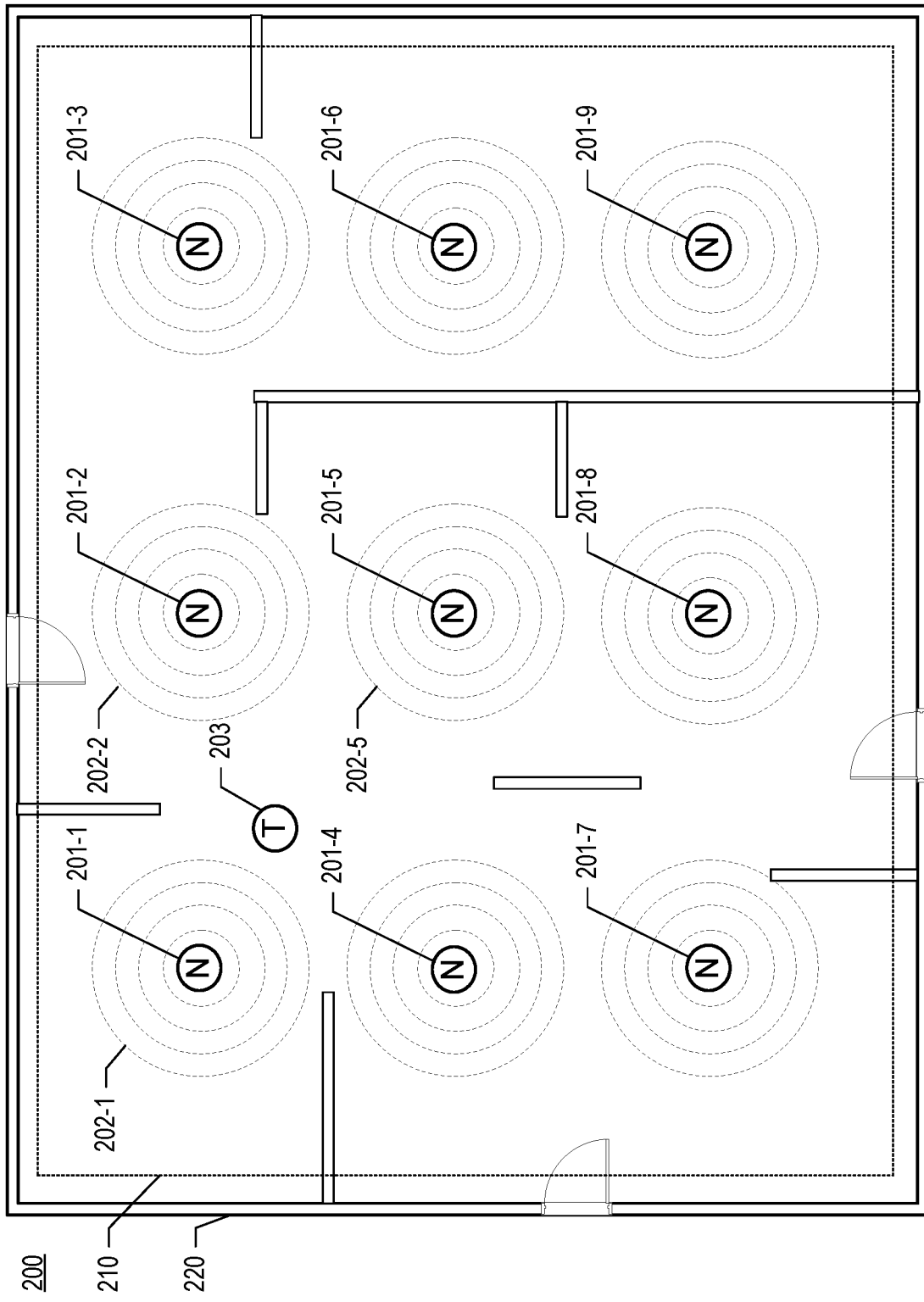
FIG. 2 depicts networked lighting control system 200 and mesh network 210 in accordance with the illustrative embodiment.

FIG. 2 depicts networked lighting control system 200 in accordance with the illustrative embodiment, which comprises network nodes 201-1 through 201-M (labeled with an "N" for "node"), wherein M is a positive integer (e.g., M equal to 9 as depicted, etc.) situated within building 220, and testing device 203 (labeled with an "T" for "testing"). Network nodes 201-1 through 201-M make up data network 210; as mesh nodes, they are provisioned devices that are, as a result, capable of operating within a mesh network.

Control system 200 is an example of a system having distributed logic. More particularly, in control system 200 of the illustrative embodiment, control functionality is distributed among the network nodes. Being equally privileged with one another, network nodes 201-1 through 201-M are peer devices to one another. With nodes 201-1 through 201-M operating as "smart nodes," control system 200 provides "connected lighting" or networked "smart lighting."

Data network 210 is a mesh network, as is known in the art, and enables communication among network nodes 201-1 through 201-M, wherein M is a positive integer (e.g., M equal to 9 as depicted, etc.). To this end, the nodes within network 210 distribute data (e.g., the packet-based messages, etc.) among one another in accordance with mesh networking. A "mesh network" is a network topology in which each node relays data for the network. The nodes that are involved cooperate in the distribution of data in the network. A mesh network can relay messages—for example, by using a flooding technique and/or a routing technique.

In accordance with the illustrative embodiment, mesh network 210 uses Bluetooth as the underlying radio technology to communicate among devices. As those who are skilled in the art will appreciate after reading this specification, network 210 can use a different radio technology than Bluetooth. The requirements to enable an interoperable mesh networking for Bluetooth wireless technology are defined in the Bluetooth Mesh Networking specifications, including the "Mesh Profile Specification," Revision v1.0.1, Jan. 21, 2019, which is incorporated by reference herein. Additional information is defined in the "Bluetooth Core Specification," Revision v4.0, which is incorporated by reference herein.

The Bluetooth wireless communication standard is typically employed for exchanging communications between fixed or mobile Bluetooth-enabled devices over short distances. In some configurations, the systems and methods disclosed herein may be applied to Bluetooth Low Energy (or "Bluetooth LE" or "BLE") devices. The BLE extension of the Bluetooth standard is focused on energy-constrained applications such as battery-operated devices, sensor applications, and so on.

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZIgBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

Each mesh network node 201-$m$ (or "mesh node"), wherein m has a value between 1 and M, inclusive, is an apparatus that comprises memory, processing components, and communication components. In addition to communicating with other nodes, each mesh node is capable of performing one or more functions, as described below. Node 201-$m$ is described in detail below and in FIG. 3, and at least some of the operations performed by the node are described below and in FIG. 5.

Mesh node 201-$m$ can be, or be based on, a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an internet of Things (IoT) device, an application-specific device, an access terminal, a computer, a laptop computer, a desktop computer, a tablet computer, and so on, for example and without limitation.

Testing device 203 is illustratively a tablet computer with at least packet data capability provided and supported by the network in which it operates and that is configured to execute a software application (e.g., an "app") for controlling the testing of one or more of mesh nodes 201-1 through 201-M. In some embodiments of the present invention, device 203 is also configured to install and provision mesh devices that, when installed and provisioned, function as mesh nodes 201-1 through 201-M. Device 203 itself, in some embodiments, can be configured to act as a mesh node as described within this specification. Testing device 203 is described in detail below and in FIG. 4, and at least some of the operations performed by device 203 are described below and in FIG. 8.

Testing device 203 can be, or be based on, a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an internet of Things (IoT) device, an application-specific device, an access terminal, a computer, a laptop computer, a desktop computer, a tablet computer, and so on, for example and without limitation.

In some embodiments of the present invention, device 203 comprises, or is itself, an Internet Protocol-to-Bluetooth gateway. The Internet Protocol (IP) end of the gateway function can interface to wired Ethernet, WIFI, 4G/LTE, or 5G, for example and without limitation. Device 203 is wireless in the sense that it comprises a radio (e.g., Bluetooth radio, etc.) on at least one end of its gateway function.

From a data network perspective, the nodes within data network 210 are depicted according to how they are situated within building 220, according to a floor plan. As depicted in FIG. 2, nodes 201-1 through 201-M ("nodes 201") are luminaires. Each luminaire comprises a controller unit and an actor unit—in the illustrative embodiment, a luminaire with controller logic and comprising a controllable lamp as an actor unit. The networked nodes communicate wirelessly with one another via transmitted signals 202-1, 202-2, and so forth, via network 210.

Node 201-$m$ is configured to transmit signals 202-$m$ that convey control-related information, such as packet-based messages containing output control indications. Additionally, node 201-$m$ is configured to provide light at an output that is based, at least in part, on the content of one or more data packet messages received from one or more other luminaires (e.g., output control data messages, etc.) and/or from testing device 203. In some alternative embodiments, node 201-$m$ can be configured to affect a physical quantity different than light output (e.g., light color, sound level, etc.), and at an output that is based, at least in part, on the content of one or more data packet messages received from one or more of the other mesh nodes 201-$m$ (e.g., output control data messages, etc.) and/or from testing device 203. A list of physical quantities that can be affected is provided below and with regard to the description of actor unit 302 in FIG. 3.

In accordance with the illustrative embodiment, nodes 201 constitute an automation and control system—more specifically, a networked lighting system—in a commercial building, such as an office space or a retail space. As those who are skilled in the art will appreciate after reading this specification, however, the luminaires can also be applied to a different type of building, such as a home, or to include the environment surrounding the building, or to any environment in which automated control can be applied.

Furthermore, building 220 can be a different type of structure with a roof and walls, or can instead be a defined area that comprises multiple sub-areas (e.g., open space, cubicles, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As depicted, nodes 201 are positioned uniformly in a grid-like pattern. However, as those who are skilled in the art will appreciate after reading this specification, the luminaires can be positioned in any geometry or geometries with respect to one another, provided that each luminaire is within communication range of one or more of the other luminaires.

Figure 3:
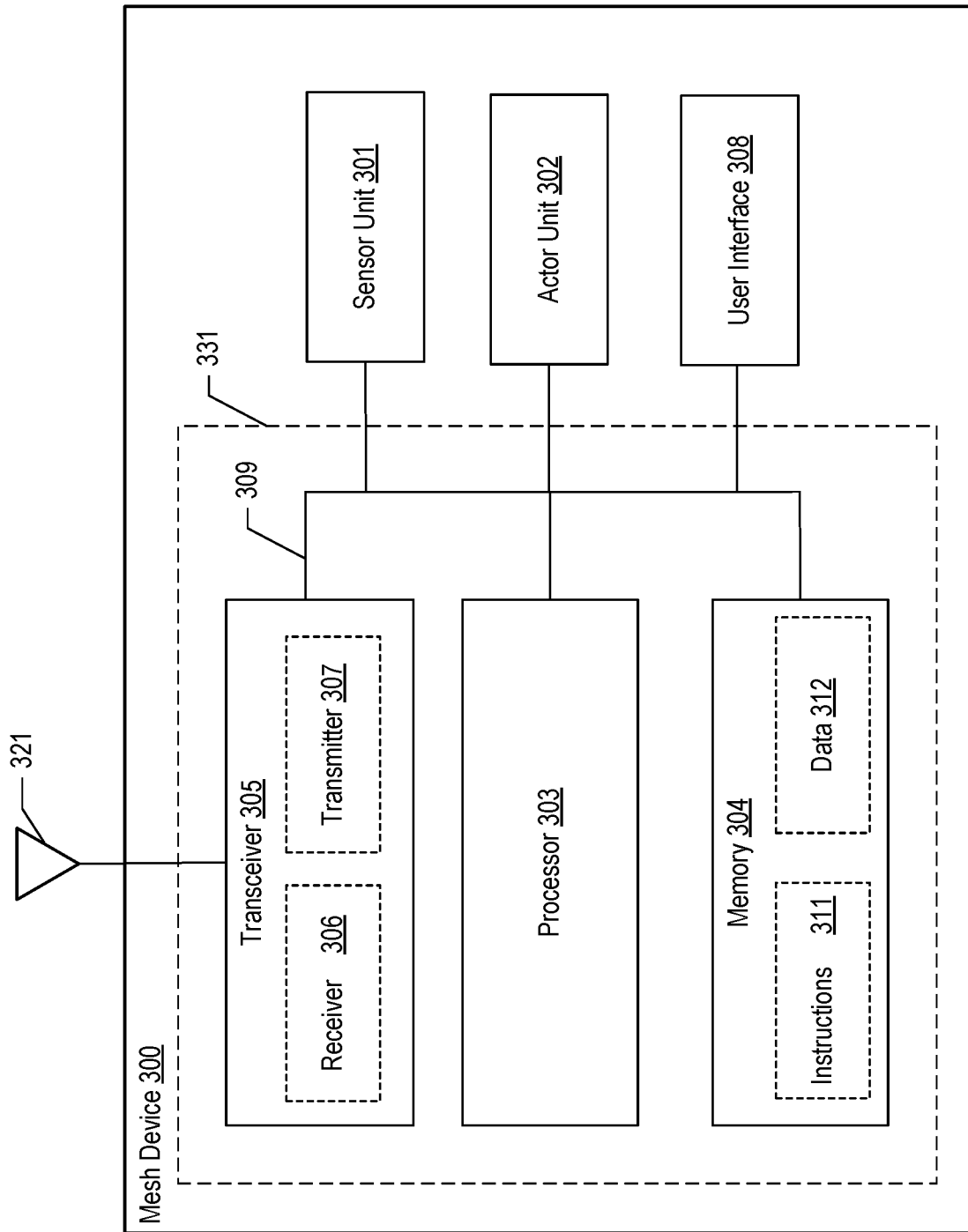
FIG. 3 depicts the salient components of mesh device 300 according to the illustrative embodiment.

FIG. 3 depicts the salient components of mesh device 300 according to the illustrative embodiment. Device 300 is based on a data-processing apparatus whose hardware platform comprises at least some of: sensor unit 301, actor unit 302, processor 303, memory 304, transceiver 305, and user interface 308, interconnected as shown. Mesh device 300 is a device (e.g., a Bluetooth device, etc.) that is capable of being provisioned and thus becoming a mesh node and a member of mesh network 210. For example, the mesh device 300 can be provisioned as any of nodes 201-1 through 201-M of FIG. 2.

Various nodes within mesh network 210 can comprise different combinations of sensors, actors, processors, memory, and transceivers. For example, some nodes within mesh network 210 can comprise a controllable lamp (i.e., an actor unit), a processor, a transceiver, and, optionally, a sensor unit (e.g., for sensing occupancy, for sensing ambient light, etc.), although some such nodes might not comprise a sensor unit. As those who are skilled in the art will appreciate after reading this specification, different configurations of mesh nodes are possible, wherein each node is based on one or more of the components that are described below.

Sensor unit 301 is an apparatus that comprises memory, processing components, and communication components, and is configured to gather information about the environment that is accessible by the sensor unit. Mesh device 300 can have one or more sensor units 301, wherein each sensor is configured to monitor a particular physical quantity (e.g., temperature, illuminance of ambient lighting, humidity, motion, occupancy, etc.). For example, a first sensor unit 301 can sense occupancy measured in terms of whether someone is present or not, and might be included in some, but not necessarily all, of the nodes within mesh network 210.

Each sensor unit is configured to report a state of the physical quantity by providing input signals to processor 303, wherein the values of the input signals are representative of the states being reported. A given sensor unit 301 can report discrete input signal values and/or a continuum of states and can report states at particular times and/or continuously. A change in state, which is determined by processor 303 as described below, can occur based one or more sensor units detecting changes in the following, in any combination:

i. environmental probes (e.g., temperature, ambient light, occupancy or motion, infrared signature, humidity, air quality, sound level, etc.).
  ii. electrical inputs (i.e., binary, analog, bus), including from a switch.
  iii. signals received via radio (e.g., proximity beacons, etc.).
  iv. a state of the internal logic, woken up periodically based on time or on an external event.

For example and without limitation, a state change can correspond to a switch being actuated, occupancy being detected, a timer or counter reaching a predefined value, and so on.

Actor unit 302 is an apparatus that comprises memory, processing components, and communication components, and is capable of doing something in the course of being affected by signals originating externally to the actor component, such as from processor 303, as described in detail below. Mesh device 300 can have one or more actor units 302, wherein each actor unit acts upon its environment. In accordance with the illustrative embodiment, a first actor unit 302 is a lamp.

Actor unit 302 is configured to receive, transmit, process, and/or relay signals conveying data, as well as being configured to affect a quantity, physical or otherwise, in its environment. Actor unit 302 provides or performs a predetermined function, such as a lamp giving off light according to a configurable light output and controlled by a control signal generated by processor 303. For example and without limitation, the quantity or condition being affected can be:

i. lighting, which can be adjusted (e.g., turning on or off, changing light output, changing brightness, changing color or mood, changing illuminance, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, fan speed, etc.).
  iv. an alert, which can be generated (e.g., of an email, of an SMS message, etc.).
  v. monitoring by a camera, which can be panned or tilted.
  vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).
  viii. virtual keyboard—navigation on virtual keyboard displayed by other device (e.g., video monitor, set-top box, etc.).
  ix. control of shades/window coverings/blinds.
  x. access control (e.g., unlocking/locking doors, opening/shutting doors, authorizing access to selected rooms or zones, etc.).

Furthermore, device 300 can comprise any combination of and any number of actor functions. As those who are skilled in the art will appreciate, after reading this disclosure, device 300 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 303 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. Processor 303 is capable of providing control signals for one or more purposes as described in this specification.

Figure 5:
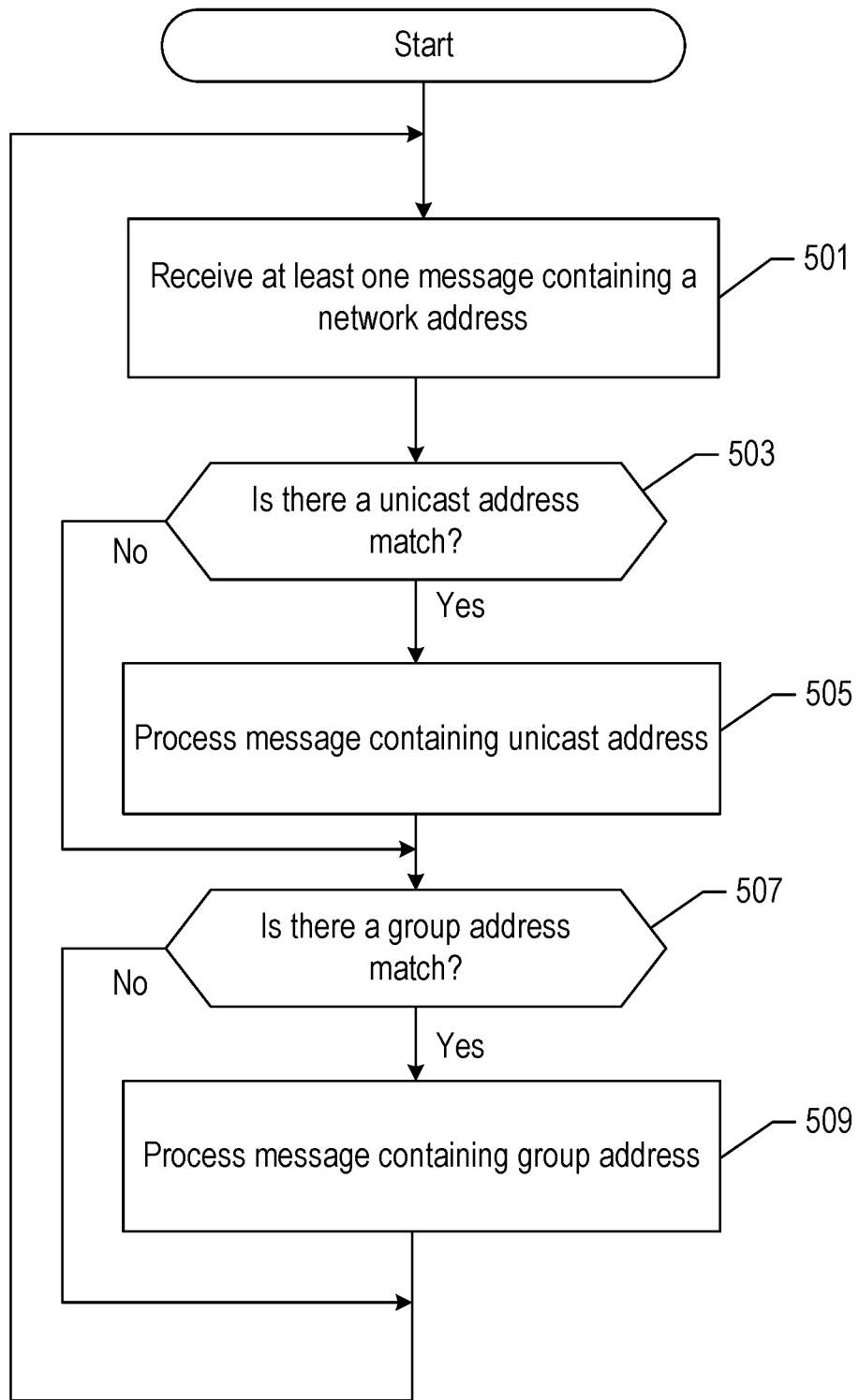
FIG. 5 depicts salient operations of method 500 according to the illustrative embodiment, by which each luminaire node 201-*m* performs various functions.

Processor 303 is configured such that, when operating in conjunction with the other components of device 300, processor 303 executes software in the form of instructions 311, processes data in the form of data 312, and telecommunicates according to the operations described herein, including at least some of those depicted in FIG. 5 and other flow diagrams. Processor 303 can be referred to as a "central processing unit" (CPU). Although just a single processor 303 is shown as part of mesh device 300 of FIG. 3, in an alternative embodiment a combination of processors (e.g., an ARM and DSP) can be used.

Processor 303, and memory 304 and transceiver 305 described below, constitute controller unit 331. In some embodiments of the present invention, controller unit 331 is a system on a chip (SoC) such as, but not limited to, an nRF52832 integrated circuit (IC) by Nordic Semiconductor.

Memory 304 is an electronic component capable of storing electronic information, and is in electronic communication with processor 303 (i.e., the processor can read information from and/or write information to the memory). Memory 304 can be configured as random-access memory (RAM), read-only memory (ROM), magnetic disk storage media, optical storage media, flash memory, on-board memory included with the processor, erasable programmable read-only memory (EPROM), electrically erasable programmable read-only memory (EEPROM), registers and so forth, including combinations thereof. At least some of memory 304 is non-transitory and non-volatile computer storage memory technology that is known in the art.

Memory 304 is configured to store an operating system, application software in the form of instructions 311, and a database in the form of data 312. The operating system is a collection of software that manages device 300's hardware resources and provides common services for computer programs, such as those that constitute the application software.

The application software that is executed by processor 303 according to the illustrative embodiment enables device 300 to perform the functions disclosed herein. Instructions 311 that constitutes the application software can include one or more programs, routines, sub-routines, functions, procedures, code, and so on. The instructions may include a single computer-readable statement or many computer-readable statements. Instructions 311 may be executable by processor 303 to implement the methods disclosed herein. Executing the instructions may involve the use of the data 312 that is stored in memory 304. Memory 304 stores one or more network addresses relevant to mesh device 300, including, but not limited to, the unicast address(es) of the mesh device and/or the group address(es) that the mesh device is subscribed to. When processor 303 executes instructions 311, various portions of the instructions can be loaded onto processor 303, and various pieces of data 312 can be loaded onto processor 303.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Radio transceiver 305, which is a communication interface, is configured to enable device 300 to telecommunicate with other devices and systems, including other mesh network nodes, by receiving signals therefrom and/or transmitting signals thereto via receiver 306 and transmitter 307, respectively. Transceiver 305 communicates in accordance with Bluetooth mesh networking. In some other embodiments, transceiver 305 communicates via one or more other radio telecommunications protocols other than or in addition to Bluetooth mesh networking, as described earlier.

Receiver 306 is a component that enables device 300 to telecommunicate with other components and systems by receiving signals that convey information therefrom and through antenna 321. It will be clear to those having ordinary skill in the art how to make and use alternative embodiments that comprise more than one receiver 306.

Transmitter 307 is a component that enables device 300 to telecommunicate with other components and systems by transmitting signals that convey information thereto and through antenna 321. It will be clear to those having ordinary skill in the art how to make and use alternative embodiments that comprise more than one transmitter 307.

In some embodiments of the present invention, transceiver 305 is implemented on hardware that is physically distinct from that of processor 303, while in some other embodiments transceiver 305 is implemented on the same hardware (IC) as processor 303.

As depicted, mesh device 300 has a single transceiver 305. As those who are skilled in the art will appreciate after reading this specification, mesh device 300 can have multiple transceivers. Furthermore, each transceiver 305 can have one or more receivers 306 and/or one or more transmitters 307.

In some embodiments of the present invention, mesh device 300 also comprises user interface 308. Interface 308 enables a user to interact with mesh device 300 and can comprise one or more of a touchscreen, a keyboard, a keypad, one or more switches or buttons, a pointing device, a display, and so on, for example and without limitation.

The various components of mesh device 300 can be electrically connected to one another by one or more buses, which may include a power bus, a control signal bus, a status signal bus, a data bus, and so on. For purposes of clarity, the various buses are illustrated collectively in FIG. 3 as bus system 309.

Figure 4:
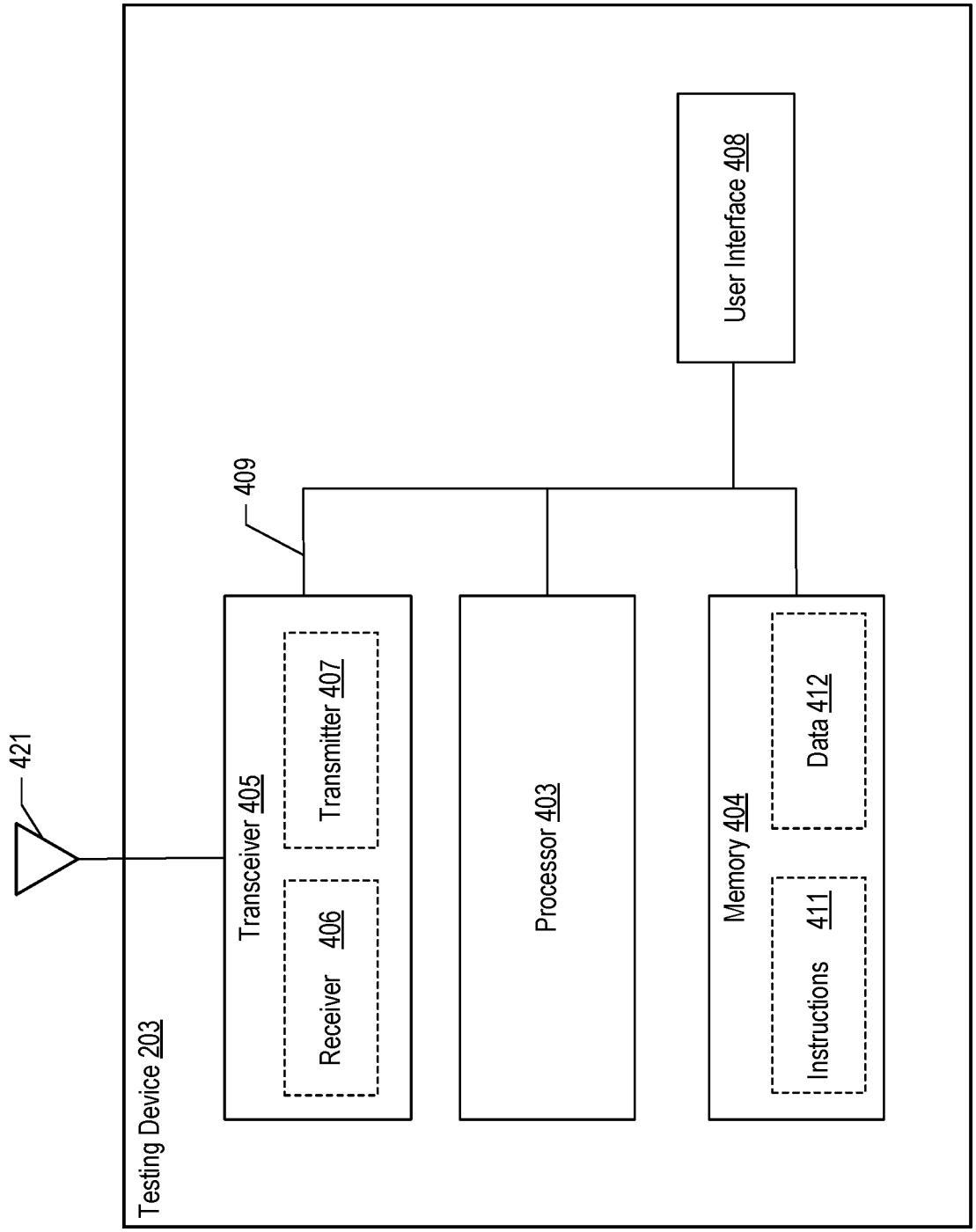
FIG. 4 depicts the salient components of testing device 203 according to the illustrative embodiment.

FIG. 4 depicts the salient components of testing device 203 according to the illustrative embodiment. Device 203 is based on a data-processing apparatus whose hardware platform comprises at least some of: processor 403, memory 404, transceiver 405, and user interface 408, interconnected as shown. Illustratively, testing device 203 is a tablet computer.

Processor 403 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. Processor 403 is capable of providing control signals for one or more purposes as described in this specification.

Figure 8:
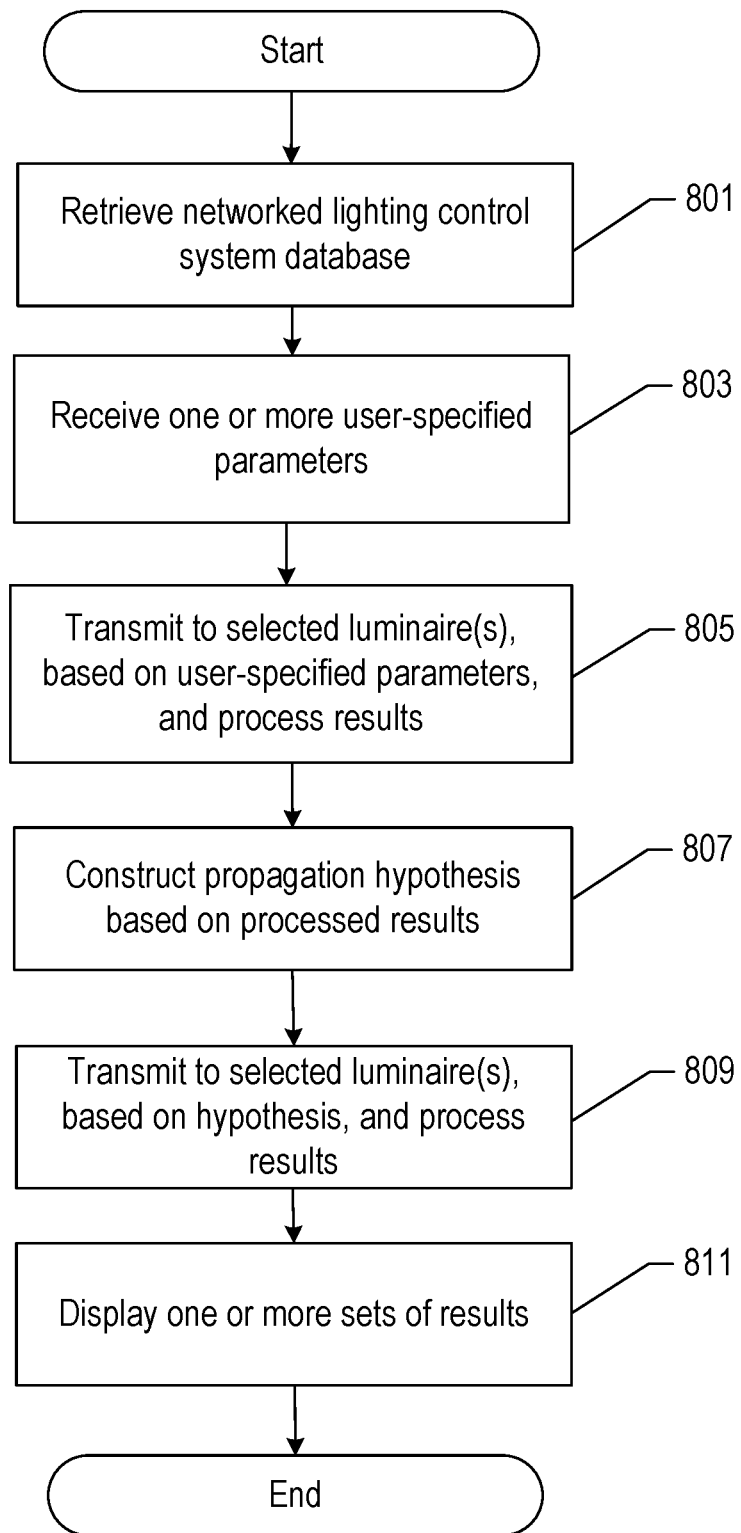
FIG. 8 depicts salient operations of method 800 according to the illustrative embodiment, by which testing device 203 performs various functions related to the coordination of testing.

Processor 403 is configured such that, when operating in conjunction with the other components of device 203, processor 403 executes software in the form of instructions 411, processes data in the form of data 412, and telecommunicates according to the operations described herein, including at least some of those depicted in FIG. 8 and other flow diagrams. Processor 403 can be referred to as a "central processing unit" (CPU). Although just a single processor 403 is shown as part of testing device 203 of FIG. 4, in an alternative embodiment a combination of processors (e.g., an ARM and DSP) can be used.

Memory 404 is an electronic component capable of storing electronic information, and is in electronic communication with processor 403 (i.e., the processor can read information from and/or write information to the memory). Memory 404 can be configured as random-access memory (RAM), read-only memory (ROM), magnetic disk storage media, optical storage media, flash memory, on-board memory included with the processor, erasable programmable read-only memory (EPROM), electrically erasable programmable read-only memory (EEPROM), registers and so forth, including combinations thereof. At least some of memory 404 is non-transitory and non-volatile computer storage memory technology that is known in the art.

Memory 404 is configured to store an operating system, application software in the form of instructions 411, and a database in the form of data 412. The operating system is a collection of software that manages device 203's hardware resources and provides common services for computer programs, such as those that constitute the application software.

The application software that is executed by processor 403 according to the illustrative embodiment enables device 203 to perform the functions disclosed herein. Instructions 411 that constitutes the application software can include one or more programs, routines, sub-routines, functions, procedures, code, and so on. The instructions may include a single computer-readable statement or many computer-readable statements. Instructions 411 may be executable by processor 403 to implement the methods disclosed herein. Executing the instructions may involve the use of the data 412 that is stored in memory 404. When processor 403 executes instructions 411, various portions of the instructions can be loaded onto processor 403, and various pieces of data 412 can be loaded onto processor 403.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Radio transceiver 405, which is a communication interface, is configured to enable device 203 to telecommunicate with other devices and systems, including other mesh network nodes, by receiving signals therefrom and/or transmitting signals thereto via receiver 406 and transmitter 407, respectively. Transceiver 405 communicates in accordance with Bluetooth mesh networking. In some other embodiments, transceiver 405 communicates via one or more other radio telecommunications protocols other than or in addition to Bluetooth mesh networking, as described earlier.

Receiver 406 is a component that enables device 203 to telecommunicate with other components and systems by receiving signals that convey information therefrom and through antenna 421. It will be clear to those having ordinary skill in the art how to make and use alternative embodiments that comprise more than one receiver 406.

Transmitter 407 is a component that enables device 203 to telecommunicate with other components and systems by transmitting signals that convey information thereto and through antenna 421. It will be clear to those having ordinary skill in the art how to make and use alternative embodiments that comprise more than one transmitter 407.

In some embodiments of the present invention, transceiver 405 is implemented on hardware that is physically distinct from that of processor 403, while in some other embodiments transceiver 405 is implemented on the same hardware (IC) as processor 403.

As depicted, testing device 203 has a single transceiver 405. As those who are skilled in the art will appreciate after reading this specification, testing device 203 can have multiple transceivers. Furthermore, each transceiver 405 can have one or more receivers 406 and/or one or more transmitters 407.

In some embodiments of the present invention, testing device 203 also comprises user interface 408. Interface 408 enables a user to interact with testing device 203 and can comprise one or more of a touchscreen, a keyboard, a keypad, one or more switches or buttons, a pointing device, a display, and so on, for example and without limitation. Device 203 uses a touchscreen or other display component of interface 408 to present information to the user, including the results of one or more tests described herein.

The various components of testing device 203 can be electrically connected to one another by one or more buses, which may include a power bus, a control signal bus, a status signal bus, a data bus, and so on. For purposes of clarity, the various buses are illustrated collectively in FIG. 4 as bus system 409.

Overall Operations of Node 201-*m*: FIG. 5 depicts salient operations of method 500 according to the illustrative embodiment, by which each luminaire node 201-*m* performs various functions related to the coordination of its own actions, in view of testing device 203 transmitting messages and other luminaire nodes within mesh network 210 transmitting messages containing testing-related values.

In regard to method 500, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

For illustrative purposes, node 201-2 in FIG. 2 is described as performing the operations described below and in the subsequent figures. As those who are skilled in the art will appreciate, after reading this specification, one or more other nodes, instead of or in addition to node 201-2, can perform all of the described operations; furthermore, multiple nodes can perform concurrently the described operations. For example and without limitation, node 201-3 can receive one or more messages from node 201-2, as can node 201-5. And any of the aforementioned nodes can relay one or more messages to other nodes.

In accordance with operation 501, node 201-2 receives one or more messages that contain one or more addresses. Examples of a network address are a unicast address and a group address, as defined in the Mesh Profile Specification.

In accordance with operation 503, node 201-2 determines whether the one or more received messages contain an address that matches the unicast address of node 201-2. If there is a match, signifying that the message is intended specifically for node 201-2, then control of task execution proceeds to operation 505. Otherwise, control of task operation proceeds to operation 507.

In accordance with operation 505, node 201-2 processes the one or more messages that contain its unicast address. Operation 505 is described below and in regard to FIG. 6.

In accordance with operation 507, node 201-2 determines whether the one or more received messages contain an address that matches a group address to which node 201-2 is subscribed. In some embodiments, testing device 203 or another device had previously subscribed one or more luminaire nodes to a particular group address for the purpose of involving said nodes in a particular test. If there is a match, then control of task execution proceeds to operation 509. Otherwise, control of task operation proceeds back to operation 501.

In accordance with operation 509, node 201-2 processes the one or more messages that contain a subscribed—to group address. Operation 509 is described below and in regard to FIG. 7.

After operation 509, control of task execution proceeds back to operation 501, to continue to monitor for and process messages that are relevant to node 201-2.

Figure 6:
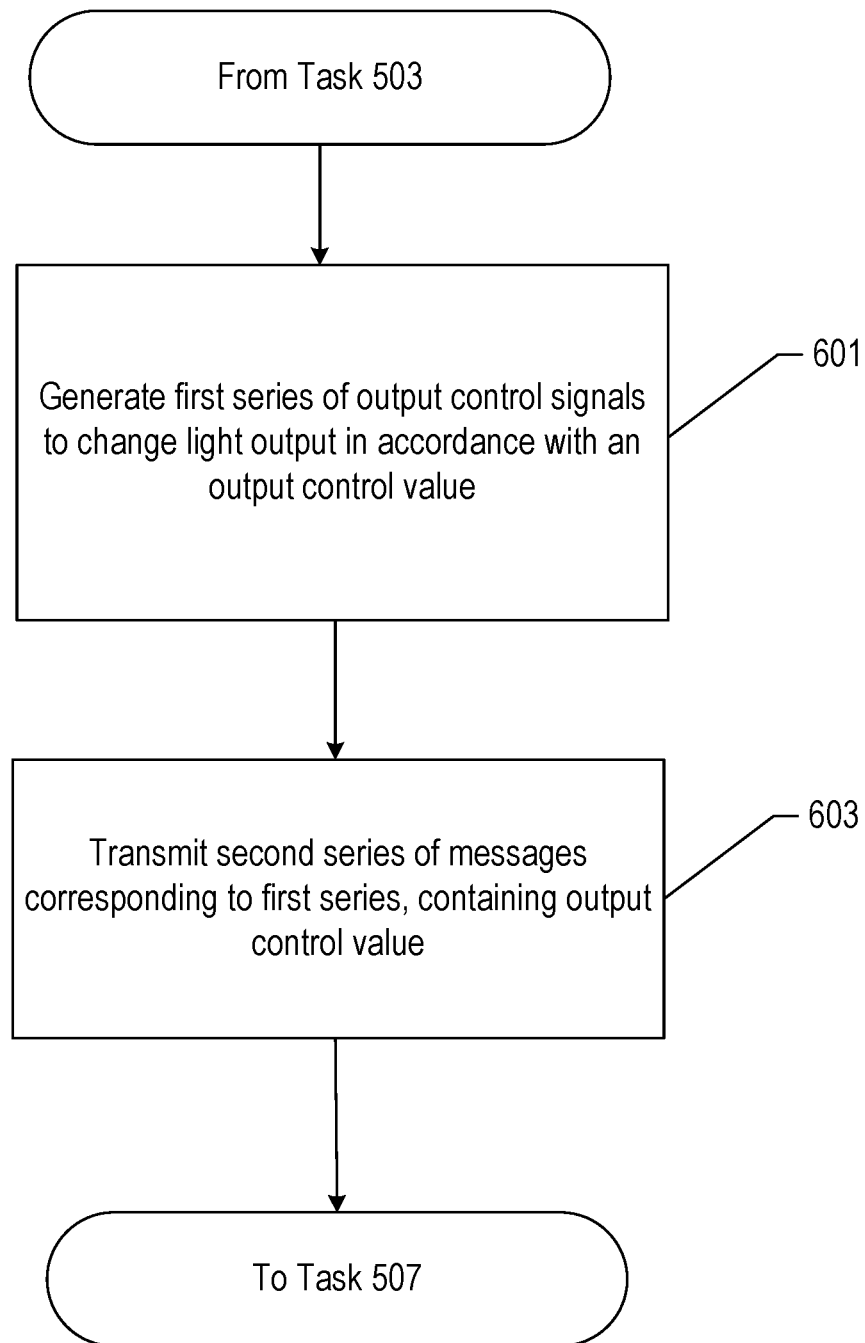
FIG. 6 depicts salient sub-operations in operation 505, by which luminaire node 201-2 performs various functions related to processing messages from testing device 203.

Operations of Node 201-*m* in Processing Messages from Testing Device 203: FIG. 6 depicts salient sub-operations in operation 505 according to the illustrative embodiment, by which luminaire node 201-2 performs various functions related to processing messages from testing device 203 that are directed to, and only to, control node 201-2 specifically. For pedagogical purposes within this specification, the node that receives such testing-related messages from device 203 is referred to as the "anchor node."

In accordance with operation 601, node 201-2 generates a first series of output control signals to change incrementally the light output in accordance with an output control indication. The form of the output control indication can be a numeric value, a message type, or something else indicating a change in output level. In accordance with the illustrative embodiment, the light output is increased incrementally. In some alternative embodiments of the present invention, the output control indication indicates instead to decrease the light output. The output control indication can be used to indicate by how much the light output is to be increased or decreased. The amount of change can be characterized as a percentage change, as an amount of lumens (or other measurement units) of change, or as a change expressed according to some other scale. In response to each output control signal, the lamp of node 201-2 changes its light output accordingly.

In some embodiments of the present invention, node 201-2 is configured to generate the first series of output control signals, further in accordance with at least one of (i) an update rate at which the successive signals are generated and (ii) a total number of iterations (i.e., total number of signals generated) specified for the test. Node 201-2, as well as other nodes, can also be configured to start at a predetermined, initial light output level (e.g., zero, etc.). In some embodiments, one or more of these parameters are provided by testing device 203.

In accordance with operation 603, node 201-2 transmits a second series of messages that correspond (e.g., in terms of update rate, in terms of number of iterations, etc.). to the first series of output control signals. Each of the transmitted messages contains the output control indication. In accordance with the illustrative embodiment, node 201-2 publishes the second series of messages to the group address being used in the test. In some embodiments of the present invention, the transmitted message contains a time-to-live (TTL) value, as defined in the Mesh Profile Specification.

In some test scenarios, node 201-2 is further configured to iteratively transmit multiple series of messages containing the output control indication. Each series in the multiple series of messages can contain a different TTL value. One of the TTL values that are used can be zero, in order to test a no-hop scenario, while one or more of the other TTL values can be positive, in order to test various numbers of relay hops amongst the nodes.

After operation 603, control of task execution proceeds to operation 507.

Figure 7:
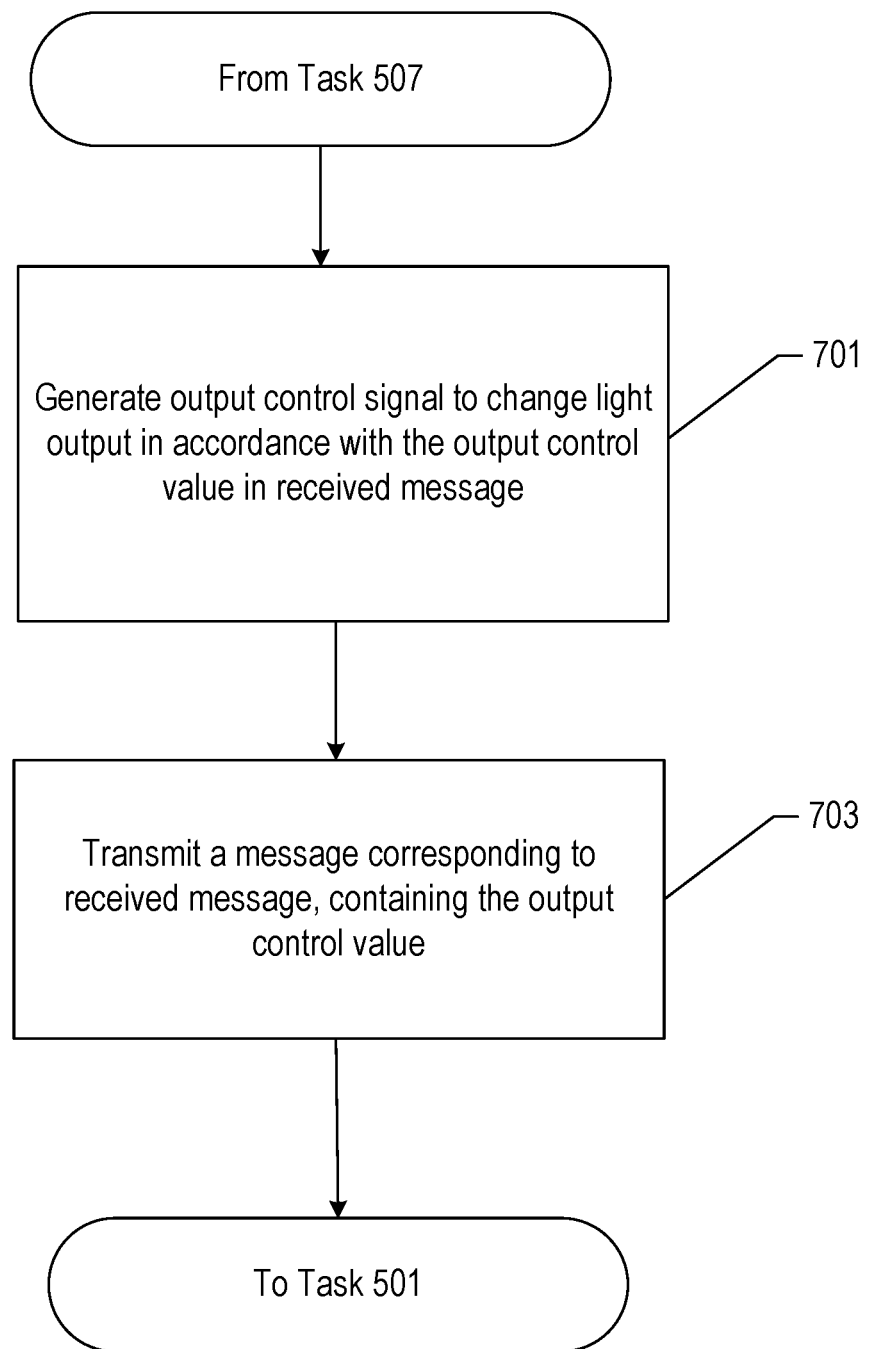
FIG. 7 depicts salient sub-operations in operation 509, by which luminaire node 201-2 performs various functions related to processing messages from another mesh node.

Operations of Node 201-m in Processing Messages from Other Mesh Nodes: FIG. 7 depicts salient sub-operations in operation 509 according to the illustrative embodiment, by which luminaire node 201-2 performs various functions related to processing messages from another mesh node (e.g., node 201-1, testing device 203 communicating as a mesh node, etc.). The values (e.g., output control indications, etc.) are published in data packets by other mesh nodes within data network 210, wherein a data-packet message to be processed by node 201-2 contains a group address that matches a group address previously subscribed to by node 201-2.

Similarly, node 201-3, if subscribed to the testing group address, can process one or more messages published by or relayed by node 201-2 or other nodes, as can node 201-5 and other nodes.

In accordance with operation 701, node 201-2 generates an output control signal to incrementally change (e.g., increase, decrease, etc.) the light output in accordance with the output control indication in the received message. In response to the output control signal, the lamp of node 201-2 changes its light output accordingly. In some embodiments of the present invention, the luminaire node had been configured to start out at the same, initial light output (e.g., zero, etc.) as one or more other luminaires involved in the test.

In accordance with operation 703, node 201-2 transmits a message that corresponds to the received message. The transmitted message contains the output control indication. In some embodiments of the present invention, the transmitting of the message depends on a time-to-live (TTL) value, as defined in the Mesh Profile Specification.

After operation 703, control of task execution proceeds to operation 501.

Overall Operations of Testing Device 203: FIG. 8 depicts salient operations of method 800 according to the illustrative embodiment, by which testing device 203 performs various testing-related functions related to the coordination of its own actions, as well as those of one or more mesh nodes 201-m by transmitting testing-related values to at least one of the nodes.

In regard to method 800, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

In accordance with operation 801, testing device 203 retrieves a networked lighting control system database. The database describes network 210 including, among other things, the relationships amongst nodes 201-1 through 201-M, including their respective unicast addresses.

In accordance with operation 803, testing device 203 receives one or more user-specified parameters from an operator of the testing device. The user-specified parameters might include, while not being limited to, the following in any combination:

i. the particular luminaire or luminaires to coordinate one or more tests through,
ii. the value or values (e.g., increase/decrease direction, amount of light output change per iteration, etc.) associated with the output control indication,
iii. the initial light output level (e.g., zero, etc.),
iv. one or more time-to-live (TTL) values,
v. an update rate at which the successive light output signals are generated by a luminaire, and
vi. a total number of iterations (i.e., total number of light output signals generated) for the test.

In accordance with operation 805, testing device 203 transmits one or more messages that contain one or more unicast addresses of one or more nodes 201, and processes the results, based on the networked lighting control system database and/or the one or more user-specified parameters received. Operation 805 is described below and in regard to FIG. 9.

In accordance with operation 807, testing device 203 constructs an electromagnetic radiation (EMR) propagation hypothesis based on the results from operation 805. For example and without limitation, the electromagnetic radiation is in the form of radio frequency (RF) signals. In some embodiments, the propagation hypothesis constitutes a proposed explanation for one or more discrepancies in the retrieved light levels from two or more luminaire nodes. The proposed explanation might include a supposition such as "a discrepancy in light output level between nodes A and B is based on mesh network parameter values." or "a discrepancy in light output level between nodes C and D is based on EMR environment."

The structure of the next test can depend on the supposition. For example, one or more user-defined mesh network parameters and/or the anchor node and/or the set of nodes involved in the test can be varied. An example of constructing a propagation hypothesis is provided below and in the description of FIGS. 10 and 11.

In accordance with operation 809, testing device 203 transmits one or more messages that contain one or more unicast addresses of one or more selected nodes 201, which have been selected based on the constructed propagation hypothesis, and processes the results. Operation 809 is similar to operation 805 described below and in regard to FIG. 9.

Figure 10:
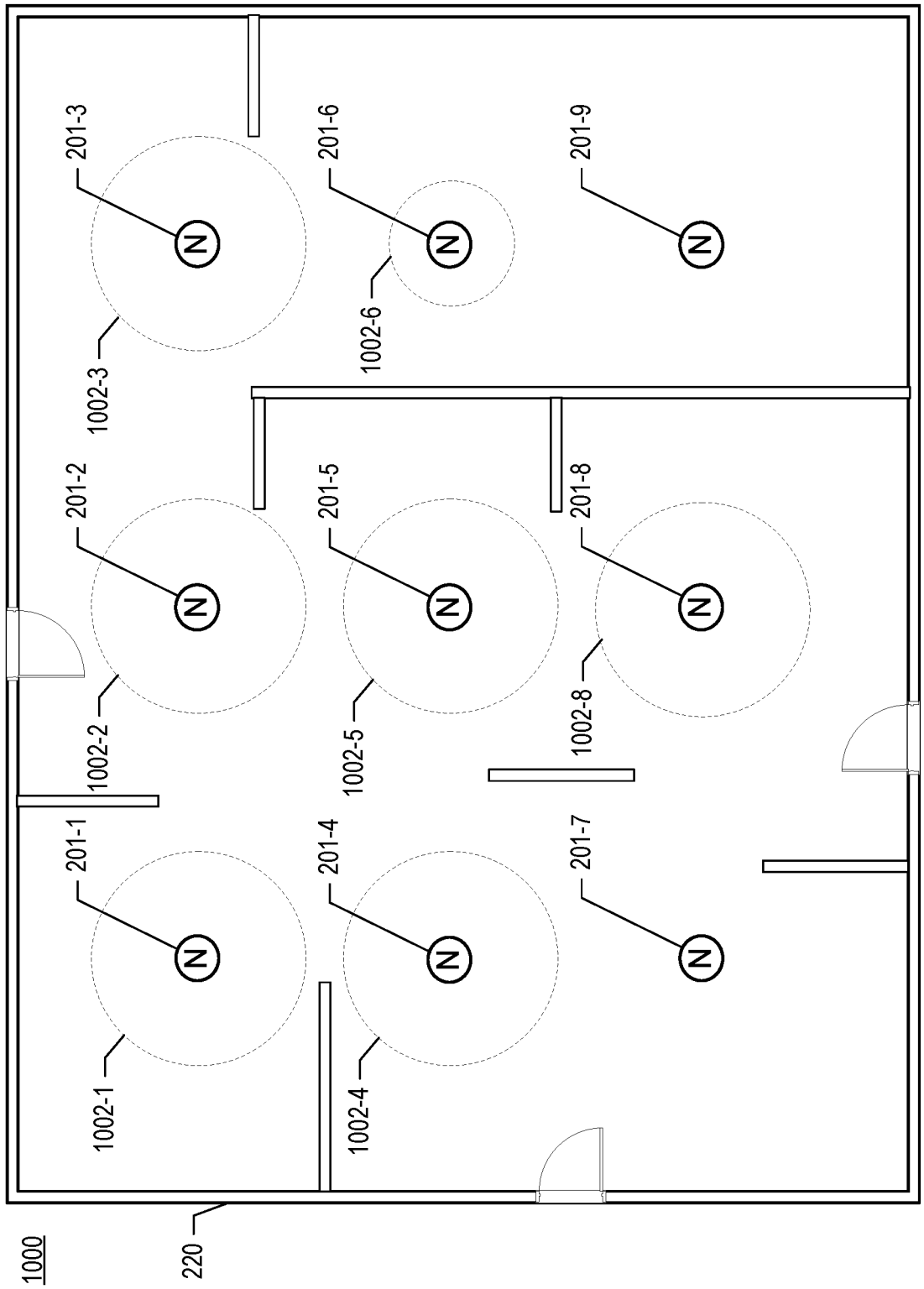
FIG. 10 depicts display screenshot 1000 of testing device 203, corresponding to the results of a first test.
Figure 11:
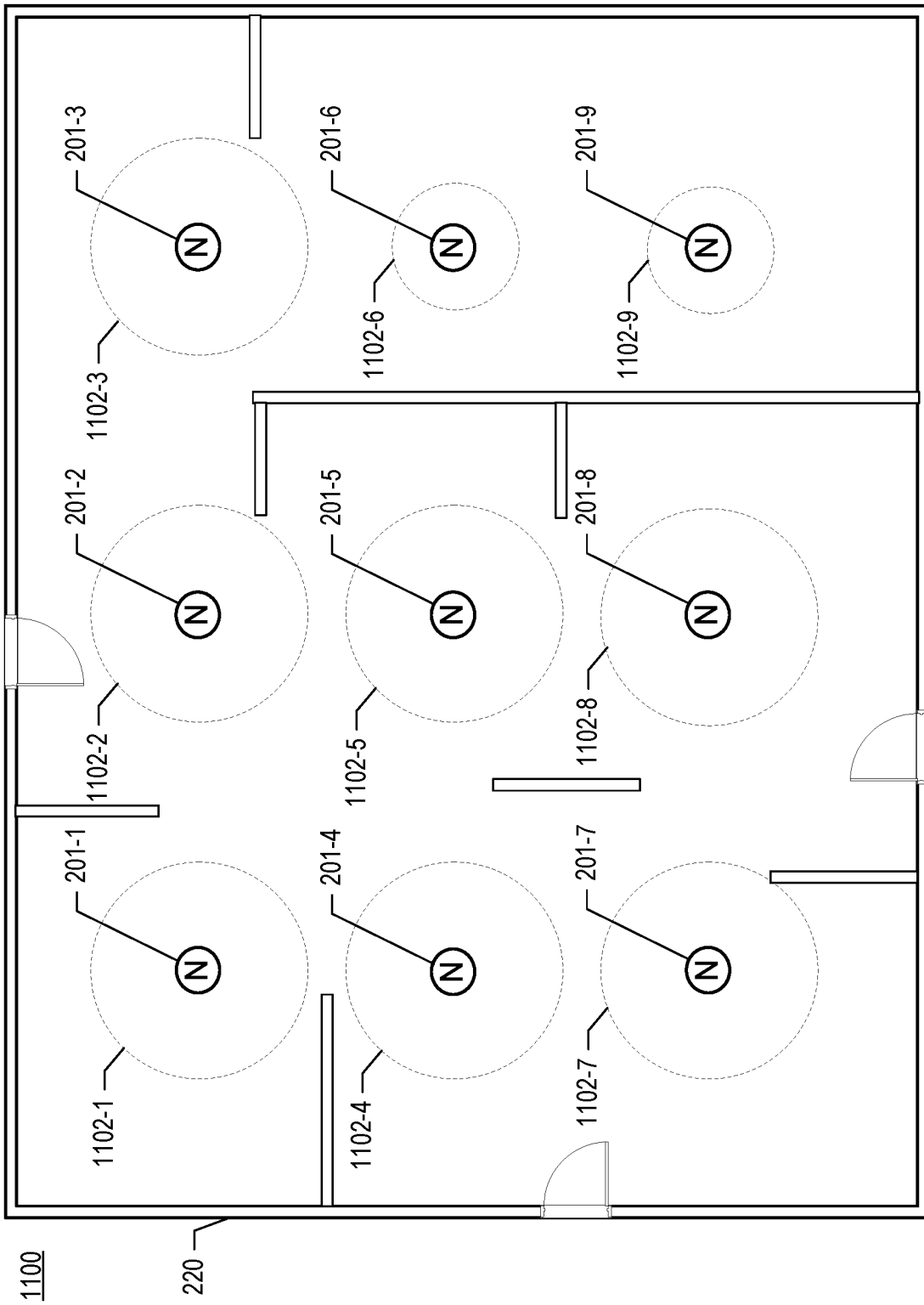
FIG. 11 depicts display screenshot 1100 of testing device 203, corresponding to the results of a second test.

In accordance with operation 811, testing device 203 displays, or otherwise presents, one or more of the results from operations 805 and/or 809, such as the results depicted in FIGS. 10 and 11.

Figure 9:
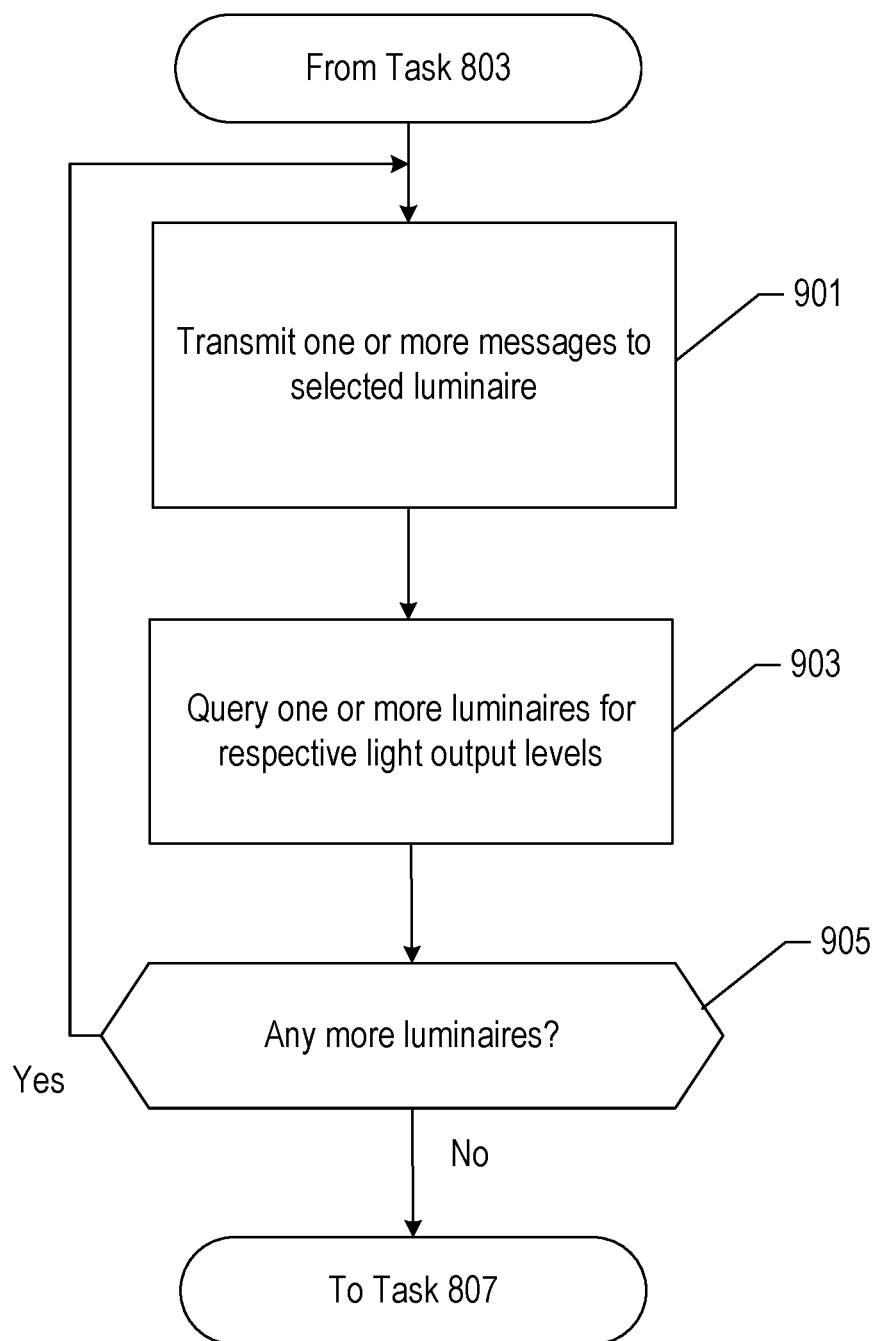
FIG. 9 depicts salient sub-operations in operation 805 or 809, by which testing device 203 coordinates various actions related to (i) transmitting one or more messages to one or more luminaires and (ii) receiving and processing results.

Operations of Testing Device 203 in Exchanging Messages with One or More Luminaire Nodes: FIG. 9 depicts salient sub-operations in operation 805 or 809 according to the illustrative embodiment, by which testing device 203 coordinates various actions related to (i) transmitting one or more messages to one or more luminaires and (ii) receiving and processing results. As those who are skilled in the art will appreciate, after reading this specification, at least some of the operations described below can be implemented by using the unicast address(es) of one or more of nodes 201, or can be implemented by using the applicable group address for the test of interest, or both.

In accordance with operation 901, testing device 203 transmits one or more messages to a selected luminaire (e.g., node 201-2, etc.). As those who are skilled in the art will appreciate, after reading this specification, device 203 can transmit one message to an anchor node (e.g., node 201-2, etc.) to essentially initiate the transmission by the anchor node of a specified number of messages that each change the light output level by a specified amount. Alternatively, device 203 can transmit the actual messages that change the light output level, wherein device 203 self-regulates the rate at which it sends the messages.

In accordance with operation 903, testing device 203 queries one or more luminaires for their respective light output levels. The light output level of interest can refer to the light output level in effect when the luminaire node receives the query, or it can refer to the light output level in effect at a specified time, or it can refer to yet another type of light output level. The light levels represent at least some of the results of having transmitted the one or more messages in operation 901.

In accordance with operation 905, if there are any additional, selected luminaires, control of task execution proceeds back to operation 901, in order to transmit additional messages to the additional luminaires. Otherwise, control of task execution proceeds to task 807 or to task 811, depending on the calling task.

As described earlier, in some alternative embodiments, node 201-m can be configured to affect a physical quantity or condition different than light output (e.g., light color, sound level, etc.), and at an output that is based, at least in part, on the content of one or more data packet messages received from one or more of the other mesh nodes (e.g., output control data messages, etc.) and/or from testing device 203. Similarly, testing device 203 can query one or more such nodes for their respective levels of the alternative quantity or condition different than light output, and present the results accordingly.

FIG. 10 depicts display screenshot 1000 of testing device 203 in accordance with the illustrative embodiment. Screenshot 1000 depicts a floor diagram of building 220 and also depicts the relative positions of network nodes 201-1 through 201-9, which, for clarity purposes, are also depicted in FIGS. 10 and 11 as network nodes 201-1 through 201-9.

Outputs 1002-1 through 1002-6 and 1002-8 are a visual representation of the relative light outputs of network nodes 201-1 through 201-6 and 201-8, respectively, after a predetermined number of lighting output control messages (e.g., 10) originated from node 201-2 (i.e., the anchor node) under the control of testing device 203 as part of a first test, and propagated through mesh network 210. All depicted nodes have been subscribed to a group address defining the test. In some cases, the light outputs are at the same, relatively high level, as with nodes 201-1 through 201-5 and 201-8. In some other cases, the light output is lower, as with node 201-6. In still some other cases, there is no light output at all, as with nodes 201-7 and 201-9. FIG. 10 depicts the results of the first test.

The relative light outputs are represented by circles, in which the larger the circle, the higher the light output. In some alternative embodiments, the light outputs are represented by something other than the circles as depicted.

Based on the results depicted in FIG. 10, a propagation hypothesis can be inferred in which nodes 201-6, 201-7, and 201-9 are not receiving any or all of the messages. The propagation hypothesis constructed in accordance with operation 807 can be based on this.

There can be multiple reasons as to why a node does not receive at least some of the messages. Some reasons can be attributed to how the parameters transmitted in the messages are configured, while some other reasons can be attributed to electromagnetic environmental conditions within the mesh network. Also, the receiving node itself might be faulty (e.g., broken antenna, broken circuit board, software lagging with respect to processing packets, etc.), hence receiving fewer packets. Accordingly, and as part of a second test, a parameter can be varied. One such parameter is the time-to-live (TTL), which determines the number of hops that a given message takes before it is no longer forwarded by a mesh node, wherein the number of hops can be greater than or equal to zero. As part of the second test, the TTL value is increased, and testing device 203 conducts the second test in accordance with operation 809, the results of which are depicted in FIG. 11.

FIG. 11 depicts display screenshot 1100 of testing device 203 in accordance with the illustrative embodiment. Screenshot 1100 depicts a floor diagram of building 220 and also depicts the relative positions of network nodes 201-1 through 201-9.

Outputs 1102-1 through 1102-9 are a visual representation of the relative light outputs of network nodes 201-1 through 201-9, respectively, after a predetermined number of lighting output control messages (e.g., 10) originated from node 201-2 (i.e., the anchor node) under the control of testing device 203 and as part of a second test, and propagated through mesh network 210. All depicted nodes have been subscribed to a group address defining the test. The larger the circle, the higher the light output. In some cases, the light outputs are at the same, relatively high level, as with nodes 201-1 through 201-5, 201-7, and 201-8. In some other cases, the light output is lower, as with nodes 201-6 and 201-7. FIG. 11 depicts the results of the second test.

Based on the results depicted in FIG. 11, a propagation hypothesis can be inferred in which nodes 201-6 and 201-9 are not receiving any or all of the messages. However, the situation has improved for node 201-7 in relation to the first test described earlier and in regard to FIG. 10, which node has apparently received all of the messages, apparently because of the increase in the TTL value as applied in the second test.

Because the increase in TTL value has had no apparent effect on nodes 201-6 or 201-7, it is increasingly likely that a problem exists in the electromagnetic environmental conditions local to nodes 201-6 and/or 201-7. An appropriate change can be made to said conditions and a third test can then be conducted.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, flash storage, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), flash storage, read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system that includes a plurality of data-networking nodes in a wireless mesh network, the system comprising:
   a testing device configured to transmit at least one message containing a first network address;
   a first luminaire in the plurality of data-networking nodes, the first luminaire comprising:
   (a) a first receiver configured to receive the at least one message containing the first network address,
   (b) a first controller configured to generate, based on the first network address matching a network address stored at the first luminaire, a first series of output control signals to change incrementally light output in accordance with an output control indication,
   (c) a first lamp configured to provide light based on the first series of output control signals, and
   (d) a first transmitter configured to transmit, via the wireless mesh network, a second series of messages containing the output control indication, wherein the second series of messages corresponds to generating the first series of output control signals; and
   a second luminaire in the plurality of data-networking nodes, the second luminaire comprising:
   (a) a second receiver configured to receive at least some of the messages in the second series of messages,
   (b) a second controller configured to generate, for each received message in the second series of messages, a second output control signal to change incrementally light output in accordance with the output control indication in the received message in the second series of messages,
   (c) a second lamp configured to provide light based on the second output control signal, and
   (d) a second transmitter configured to transmit, via the wireless mesh network and for each received message in the second series of messages, a message that contains the output control indication, resulting in a third series of messages being transmitted that correspond to the received messages in the second series of messages.

2. The system of claim 1, wherein the first transmitter of the first luminaire is configured to transmit the second series of messages, further based on a first time-to-live (TTL) value, wherein the second series of messages contains an adjusted TTL value that is based on the first TTL value.

3. The system of claim 2, wherein at least one of the testing device and the first luminaire is further configured to change the first TTL value, and wherein the first luminaire is further configured to iteratively transmit multiple series of messages containing the output control indication, wherein each series in the multiple series of messages contains a different TTL value that is based on each changed first TTL value.

4. The system of claim 1, wherein the first controller of the first luminaire is configured to generate the first series of output control signals, further in accordance with at least one of (i) an update rate and (ii) a total number of iterations specified.

5. The system of claim 1, further comprising a third luminaire comprising:
   (a) a third receiver configured to receive at least some of the messages in the second series of messages,
   (b) a third controller configured to generate, for each received message in the second series of messages, a third output control signal to change incrementally light output in accordance with the output control indication in the received message in the second series of messages, (c) a third lamp configured to provide light based on the third output control signal, and (d) a third transmitter configured to transmit, via the wireless mesh network and for each received message in the second series of messages, a message that contains the output control indication.

6. The system of claim 1, further comprising a fourth luminaire comprising:

(a) a fourth receiver configured to receive at least some of the messages in the third series of messages, (b) a fourth controller configured to generate, for each received message in the third series of messages, a fourth output control signal to change incrementally light output in accordance with the output control indication in the received message in third series of messages, (c) a fourth lamp configured to provide light based on the fourth output control signal, and (d) a fourth transmitter configured to transmit, via the wireless mesh network and for each received message in the third series of messages, a message that contains the output control indication.

7. The system of claim 1, wherein the testing device is further configured to:

(a) query the first luminaire and the second luminaire for their respective light output levels; and (b) display the light output levels of the first and second luminaire, in response to the query, superimposed on a floor plan comprising representations of the first and second luminaires.

8. The system of claim 1, wherein:

the testing device is further configured to transmit at least one message containing a second network address;

the second receiver of the second luminaire is further configured to receive the at least one message containing the second network address;

the second controller of the second luminaire is further configured to generate, based on the second network address matching the network address of the second luminaire, a second series of output control signals to change incrementally light output in accordance with the output control indication;

the second lamp of the second luminaire is further configured to provide light based on the second series of output control signals; and the second transmitter of the second luminaire is further configured to transmit, via the wireless mesh network, a fourth series of messages containing the output control indication, wherein the fourth series of messages corresponds to generating the second series of output control signals.

9. The system of claim 8, wherein the testing device is further configured to:

(a) query the first luminaire and the second luminaire for their respective light output levels; and (b) display the light output levels of the first and second luminaire, in response to the query, superimposed on a floor plan comprising representations of the first and second luminaires, and based on the light output levels that are displayed being a function of at least one of (i) the at least one message containing the first network address and (ii) the at least one message containing the second network address.

10. The system of claim 1, wherein the network address stored at the first luminaire is the unicast address of the first luminaire.

11. The system of claim 1, wherein the network address stored at the first luminaire is a group address that corresponds to a test.

12. A system that includes a plurality of data-networking nodes in a wireless mesh network, the system comprising:

a testing device configured to transmit at least one message containing a first network address;

a first luminaire in the plurality of data-networking nodes, the first luminaire comprising:

(a) a first receiver configured to receive the at least one message containing the first network address, (b) a first controller configured to generate, based on the first network address matching the network address of the first luminaire, a first series of output control signals to increase incrementally light output in accordance with an output control indication, (c) a first lamp configured to provide light based on the first series of output control signals, and (d) a first transmitter configured to transmit, via the wireless mesh network, a second series of messages containing the output control indication, wherein the second series of messages corresponds to generating the first series of output control signals; and a second luminaire in the plurality of data-networking nodes, the second luminaire comprising:

(a) a second receiver configured to receive at least some of the messages in the second series of messages, (b) a second controller configured to generate, for each received message in the second series of messages, a second output control signal to increase incrementally light output in accordance with the output control indication in the received message in the second series of messages, and (c) a second lamp configured to provide light based on the second output control signal.

13. The system of claim 12, wherein the first transmitter of the first luminaire is configured to transmit the second series of messages, further based on a first time-to-live (TTL) value, wherein the second series of messages contains an adjusted TTL value that is based on the first TTL value.

14. The system of claim 13, wherein at least one of the testing device and the first luminaire is further configured to change the first TTL value, and wherein the first luminaire is further configured to iteratively transmit multiple series of messages containing the output control indication, wherein each series in the multiple series of messages contains a different TTL value that is based on each changed first TTL value.

15. The system of claim 12, wherein the testing device is further configured to:

(a) query the first luminaire and the second luminaire for their respective light output levels; and (b) display the light output levels of the first and second luminaire, in response to the query, superimposed on a floor plan comprising representations of the first and second luminaires.

16. The system of claim 15, wherein:

the testing device is further configured to transmit at least one message containing a second network address, wherein the second network address is based on at least one of the light output levels of the first and second luminaire.

17. A system that includes a plurality of data-networking nodes in a wireless mesh network, the system comprising:

a testing device configured to (a) receive a light output level from at least one luminaire in the plurality of data-networking nodes and (b) transmit at least one message containing a first network address, wherein the first network address is based on the light output level received;

a first luminaire in the plurality of data-networking nodes, the first luminaire comprising:
  (a) a first receiver configured to receive the at least one message containing the first network address,
  (b) a first controller configured to generate, based on the first network address matching the network address of the first luminaire, a first series of output control signals to increase incrementally light output in accordance with an output control indication,
  (c) a first lamp configured to provide light based on the first series of output control signals, and
  (d) a first transmitter configured to transmit, via the wireless mesh network, a second series of messages containing the output control indication, wherein the second series of messages corresponds to generating the first series of output control signals; and a second luminaire in the plurality of data-networking nodes, the second luminaire comprising:
  (a) a second receiver configured to receive at least some of the messages in the second series of messages,
  (b) a second controller configured to generate, for each received message in the second series of messages, a second output control signal to increase incrementally light output in accordance with the output control indication in the received message in the second series of messages, and
  (c) a second lamp configured to provide light based on the second output control signal.

18. The system of claim 17, wherein the first transmitter of the first luminaire is configured to transmit the second series of messages, further based on a first time-to-live (TTL) value, wherein the first TTL value is based on the light output level received.

19. The system of claim 17, wherein the testing device is further configured to:
  (a) query the first luminaire and the second luminaire for their respective light output levels; and
  (b) display the light output levels of the first and second luminaire, in response to the query, superimposed on a floor plan comprising representations of the first and second luminaires.

20. The system of claim 19, wherein:
the testing device is further configured to transmit at least one message containing a second network address, wherein the second network address is based on at least one of the light output levels of the first and second luminaire.

* * * * *